Oct. 15, 1946. P. C. McLEMORE Re 22,803
FLAME CULTIVATION OF PLANTS
Original Filed May 8, 1942 4 Sheets-Sheet 1
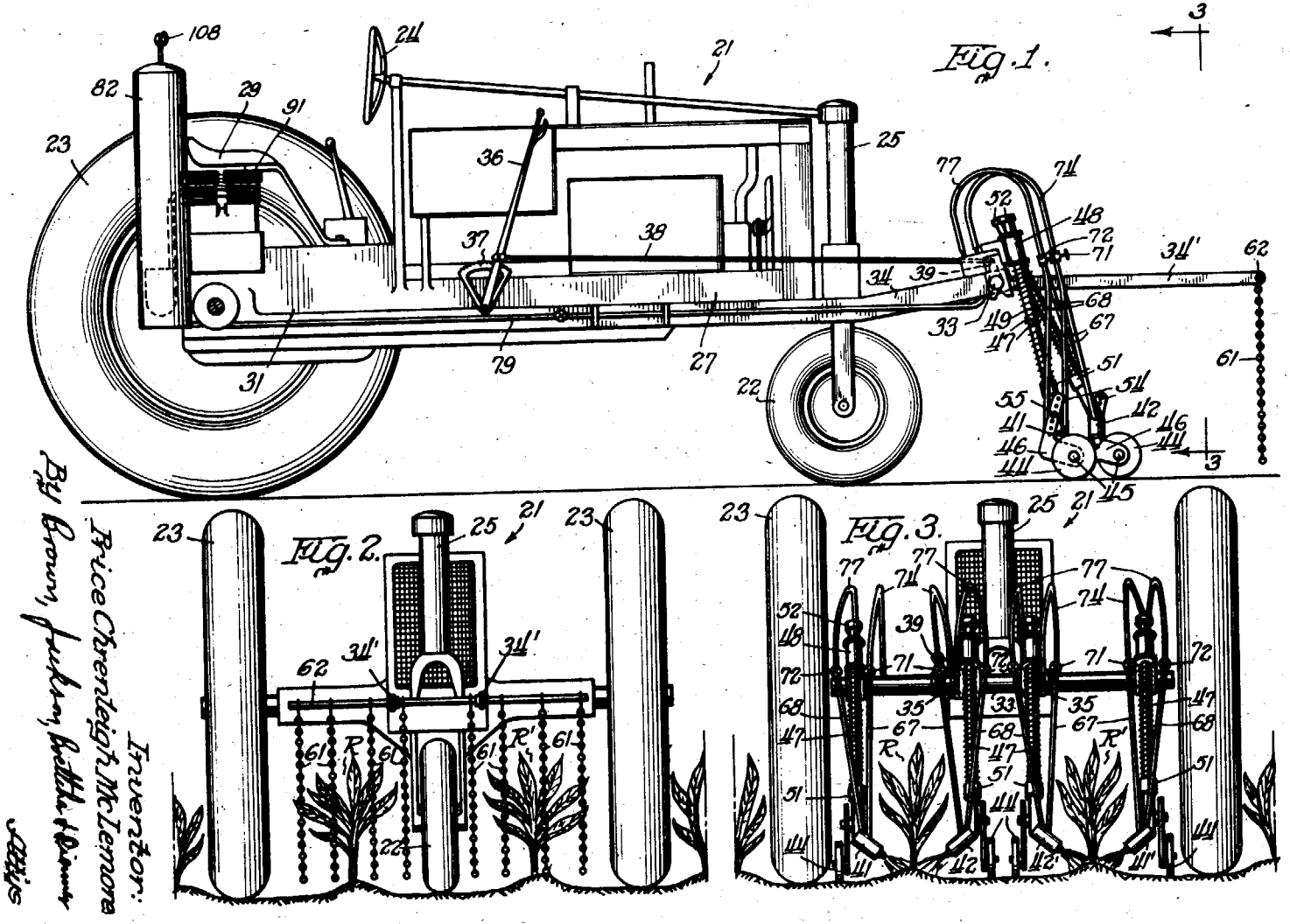
Inventor:
Price Chrenleigh McLemore
By Brown, Jackson, Boettcher & Dienner
Attys Oct. 15, 1946. P. C. McLEMORE Re 22,803
FLAME CULTIVATION OF PLANTS
Original Filed May 8, 1942 4 Sheets-Sheet 2
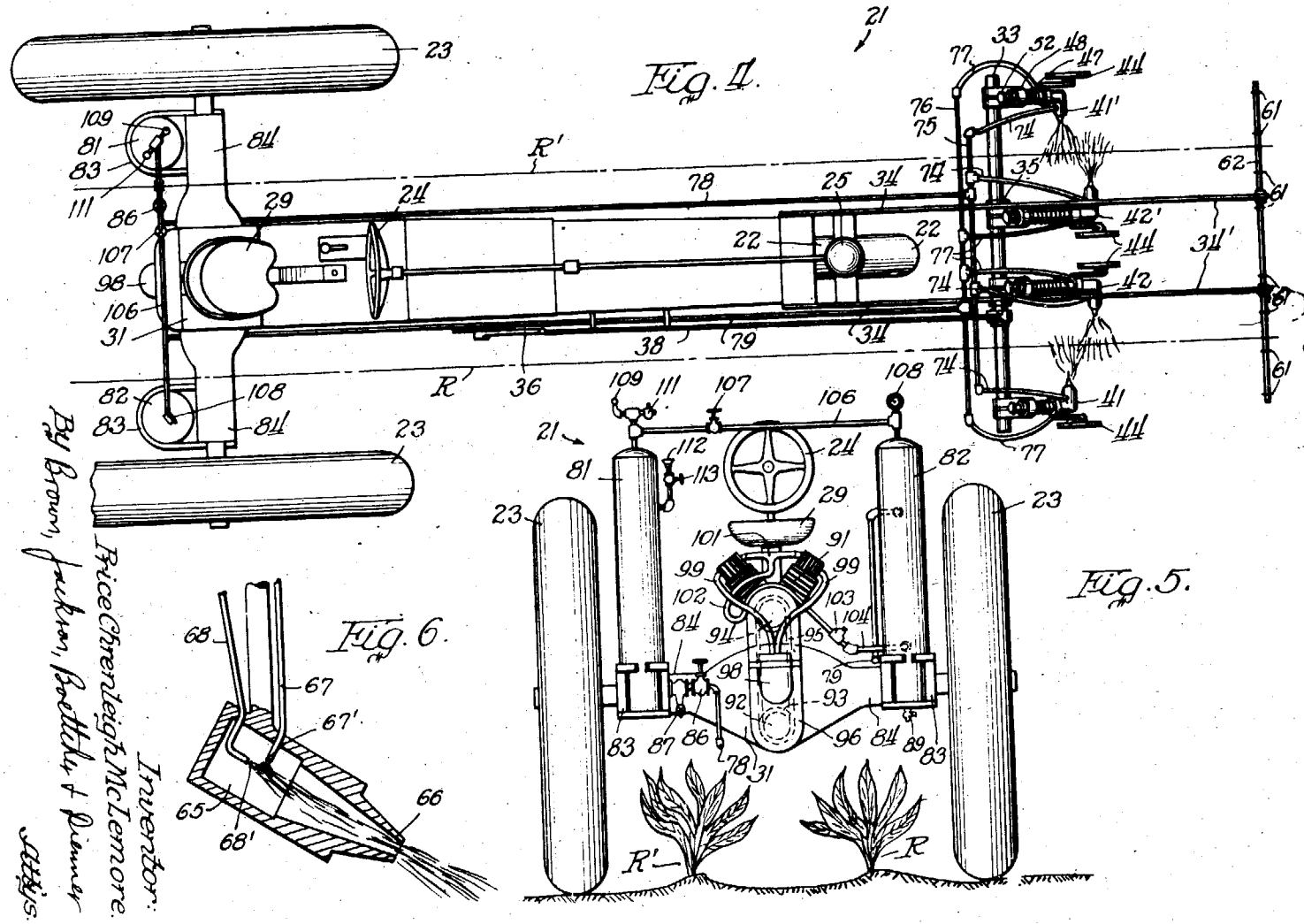
Inventor:
Price Chrenleigh McLemore.
By Brown, Jackson, Boettcher & Dienner
Attys.

FLAME CULTIVATION OF PLANTS

Original Filed May 8, 1942 4 Sheets-Sheet 3

Inventor:
Price Chrenleigh McLemore.
By Brown, Jackson, Boettcher & Dienner
Attys.

FLAME CULTIVATION OF PLANTS
Original Filed May 8, 1942 4 Sheets-Sheet 4
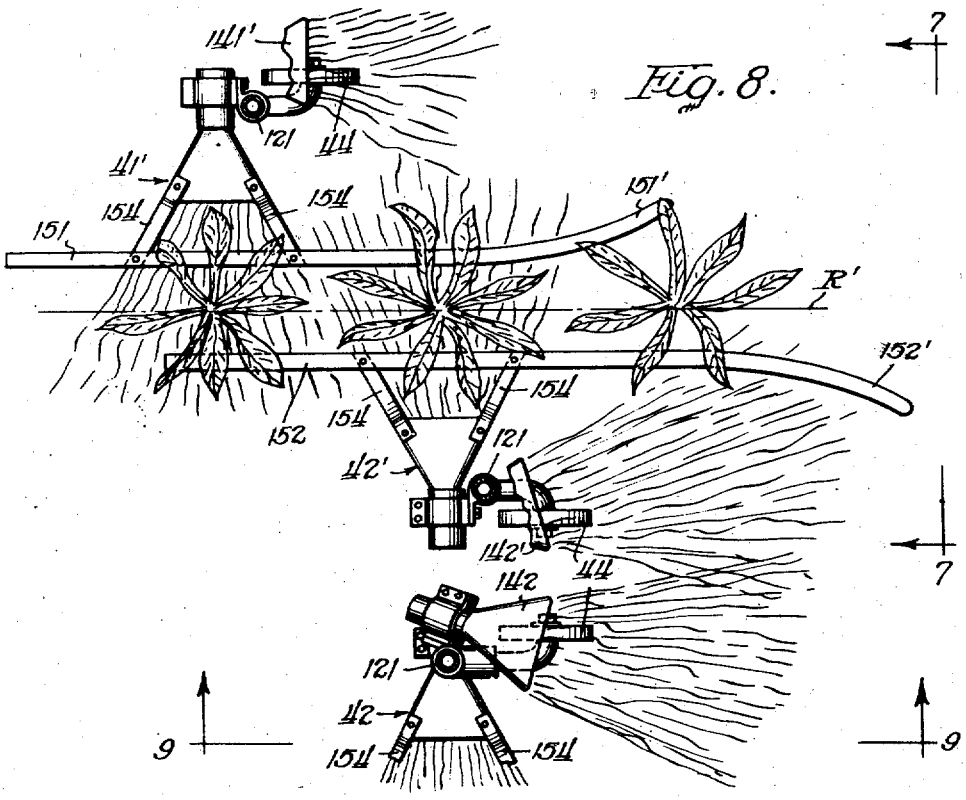
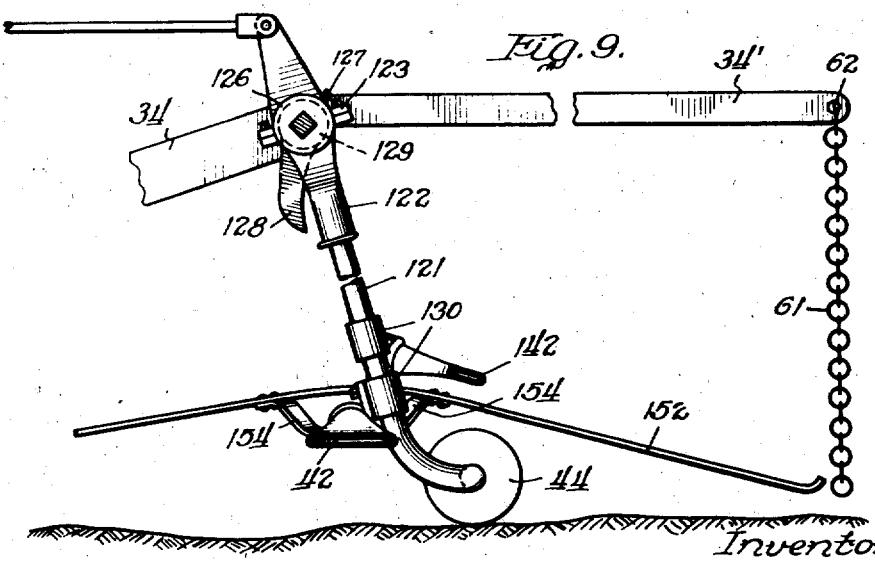
Inventor:
Price Chrenleigh McLemore
By Brown, Jackson, Boettcher & Dienner
Attys.

Reissued Oct. 15, 1946

Re. 22,803

UNITED STATES PATENT OFFICE 22,803

FLAME CULTIVATION OF PLANTS

Price C. McLemore, Waugh, Ala.

Original No. 2,369,154, dated February 13, 1945, Serial No. 442,206, May 8, 1942. Application for reissue February 11, 1946, Serial No. 646,729

47 Claims. (Cl. 47—1)

The present invention relates to the flame cultivation of plants. The disclosure of this application embodies improvements upon the disclosures of my prior Patent No. 2,327,204, issued August 17, 1943, and my prior application Serial No. 364,140, filed November 4, 1940.

My improved flame cultivation appears to have its principal field of utility in the cultivation of cotton plants, but the invention is also applicable to the cultivation of other crops, such as corn, legumes, potatoes, tomatoes, sugar cane, ramie, and even to crops such as beets, pineapples, etc. It may be applied to the cultivation of annual plants or perennial plants, and even to such types as bushes and trees if desired, particularly when it concerns the problem of suppressing volunteer vegetation such as weeds of casual or incidental plants, as against those intended to constitute the crop or to furnish the crop. Furthermore, while the apparatus herein disclosed is particularly applicable to the cultivation of row crops, the invention in its broader aspect is not limited to row crops, as will be apparent hereinafter.

In my aforementioned prior applications, I have disclosed an improved method of and apparatus for the cultivation of plants which proceeds on the discovery that there is a marked difference in the resistivity of plants to the application of heat, particularly heat at high temperature. I have found that by the application of heat under suitable control as to time, temperature, volume, and point or region of application, certain of the varieties in a stand of vegetation of mixed character may be selectively destroyed. The useful application of the principle involved in my invention resides not so much in the natural resistance to hotter or colder climates of different kinds of plants or vegetation, but rather in the different effect of, or reaction to, suddenly or rapidly applied heat, particularly at high temperatures; that is, applied at a high temperature differential. Such a process is comparable to singeing. The shape of a blade of grass is such that it presents a large area for a given volume, and also, each point in its cross section is at only a minimum distance from the surface. Hence when a flame is applied to both grass blades and to a stemmed crop plant, the grass may be cooked, scorched or burned before the stemmed crop plant receives substantial injury. This results largely from the shape of the subject treated. Rapidly applied heat, that is, a high temperature gradient, will also selectively act as between a smaller plant and a larger plant of the same species.

The apparatus of the present application comprises a vehicle adapted to travel along the rows of the crop plants and carrying liquid fuel burners from which flames are projected adjacent to or around the bases of the crop plants. Flames may also be projected along the middle areas between plant rows. For the cultivation of crops such as cotton, corn, etc., the cultivating vehicle is preferably a high wheeled tractor of the cultivator type capable of straddling two plant rows. However, for the cultivation of trees, orchards, high bushes, etc., it will be apparent that various other types of tractors or vehicles may be employed.

One of the features of the present application resides in the employment of improved burners of the high pressure atomizing type for projecting the cultivating flames. The hydrocarbon fuel is fed to each burner under pressure and is projected therefrom in the form of a high pressure jet. A source of compressed air is also fed to each burner and is projected therefrom in atomizing relation to the jet of fuel. The fuel can be distillate, furnace oil, or any one of a wide range of fuel oils capable of being atomized and burned in the above manner. The high pressure atomizing type of burner is particularly advantageous in effecting flame cultivation of plants because it enables practically any desired length and shape of flame to be obtained, and because it also enables the intensity or temperature of the flame to be adjusted through a relatively wide range. In many instances it may be desirable to employ a relatively long flame for reaching in under long overhanging leaves or branches of the crop plant so as to cause the flame to impinge against the ground all around the base of the plant without injuriously searing these overhanging leaves or branches of the plant. Furthermore, it may be desirable to make the flame of fan shape or fishtail shape characterized by a wide horizontal span or dimension capable of covering a considerable area of ground, and a relatively short vertical dimension so as to minimize the likelihood of injuriously burning the upper leaves or foliage of the plant. These attributes of long length of flame and flat shape of flame are readily obtainable in my improved structure by the use of high pressure atomizing burners and by the use of particular shapes of burner nozzles, as I shall presently describe.

The pressure type of atomizing burner also enables the intensity or temperature of the flame to be adjusted over a relatively wide range. There are a wide variety of conditions when the ability to adjust the intensity of the flame over a substantial range is quite important. For example, when starting flame cultivation of small plants or young plants which have just broken ground it may be desirable to have the burner flames of relatively low intensity. Conversely, when the plants are more advanced and have larger thicker stalks capable of standing higher temperatures it may be desirable to greatly increase the intensity of the burner flames. The nature of the weeds, grass or other parasitic vegetation may also be a factor calling for different intensities of flame. In many instances, the flame may produce a desired inhibiting action on future growth of the obnoxious vegetation without killing the same. For example, some weeds and grasses which are not killed by the flaming never seem to grow rapidly after the flaming. Included among these are ragweed, amaranthus (pigweed), and dew grass. The length of flame, volume of flame, intensity of flame, etc., can be readily proportioned in my improved flame cultivator by varying the pressure maintained in the fuel oil reservoir, by varying the pressure in the compressed air reservoir and possibly by controlling the valved flow to the burners. The apparatus of my invention includes an air compressor mounted on the tractor and driven from a power take-off of the tractor, this compressor maintaining a relatively high pressure on the fuel oil in the fuel reservoir, and also maintaining a relatively high pressure in the compressed air chamber. As illustrative of very successful operating conditions, I find that a pressure of approximately 40 lbs. on the fuel and the pressure of approximately 60 lbs. in the air tank give very good results, although it will be understood that the successful practice of the invention is not essentially limited to these pressures.

Another feature of the invention resides in an improved staggered or offset relation between the burner flames projected from opposite sides of each plant row. That is to say, the burner on one side of a plant row projects its flame substantially transversely of the row in a forward position and the burner on the other side of the plant row projects its flame substantially transversely of the row in a rearward position so that the area of flame is distributed over a longer length of plant row, and whereby each point in the plant row is subjected to flame for a greater length of time.

Another feature of the invention resides in an improved relation of burners for flaming the middle areas between plant rows and the side areas beyond plant rows.

Another feature of the invention resides in providing separate supporting wheels for the different burners or combinations of burners which are capable of rising and falling relatively to the tractor flame in traveling along the plant rows. Each of these independent supporting wheels is located in immediate proximity to its respective burner and follows the contour of the ground immediately adjacent that burner so that the burner is maintained at a substantially constant height above the ground irrespective of irregularities in the ground or any tilting of the tractor frame.

Another feature of the invention resides in improvements which increase the effectiveness of the cultivator for insect control. One of the very important advantages of cultivating cotton by the flame method is the large scale destruction of boll weevils and cotton lice by the flames.

A typical weevil infested cotton field will have boll weevils in all stages of development, such as the punctured or egg infested squares of the plant, the larvae, and the adult weevils. Practically all of the adult weevils and practically all of the cotton lice are to be found in the growing cotton plants themselves. The greater proportion of the punctured or egg infested squares are also to be found in the plants and beneath the plants, although a small proportion of these punctured or egg infested squares may also be distributed over the middle areas of ground between the plant rows. Accordingly, it is seen that most effective insect elimination is exercised at or in the plants themselves or immediately under the plants. One of the features of the present invention is the provision of improved means for agitating the plant stalks, branches, leaves, bolls, etc., for knocking as many of the adult weevils, larvae, egg infested squares, and cotton lice as possible from the upper portion of the plant down on to the ground where the cultivating flames can exert their destructive action on these parasites. Accordingly, my improved flame cultivator comprises improved means which first vigorously agitates the plants along the plant row at points substantially in advance of the burners, so that the weevils, larvae and squares will have fallen to the ground by the time the burner flames reach that particular area of the ground.

Another feature of the invention resides in the provision of improved deflectors which temporarily lift the lower leaves or foliage of long-leaved plants to elevated positions so as to hold them up out of the direct paths of the flames issuing from the burner nozzles. Such leaf lifting deflectors may be employed advantageously when cultivating tobacco, corn and other long leaf plants, particularly at that stage of their growth when the lower leaves hang down in close proximity to the ground.

Other features, objects, and advantages of the invention will appear from the following detail description of certain preferred embodiments thereof. In the accompanying drawings illustrating such embodiments:

Figure 1 is a side elevational view, more or less diagrammatic, of a tractor having my improved flame cultivator apparatus mounted thereon;

Figure 2 is a front elevational view of the cultivator showing the agitating chains at the front of the vehicle for shaking the plants to shake off insects, larvae, etc.;

Figure 3 is a front view of the cultivator taken on a plane immediately in rear of the agitating chains, approximately as indicated by the section plane 3—3 of Figure 1;

Figure 4 is a plan view of the cultivator;

Figure 5 is a rear end view of the same;

Figure 6 is a longitudinal sectional view, somewhat diagrammatic, through one form of my improved high pressure atomizing burner;

Figure 8 is a fragmentary plan view of this modified construction;

Figure 9 is a fragmentary side elevational view, corresponding to a vertical section taken approximately on the plane of the line 9—9 of Figure 8;

Figure 7:
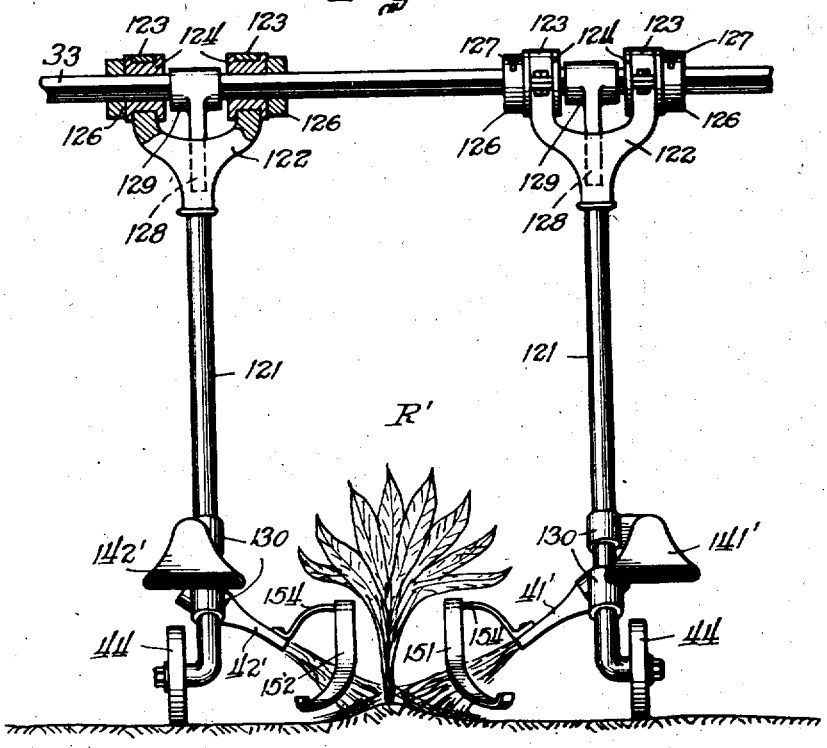
Figure 7 is a fragmentary front elevational view of a modified construction of my invention, this view corresponding approximately to a view taken on the plane of the line 7—7 of Figure 8.

Referring first to Figures 1 to 5 inclusive, I have shown a tractor 21 of conventional construction suitable for performing ordinary cultivating operations. The tractor comprises a single dirigible wheel 22 or two closely spaced dirigible wheels at the front, and driving wheels 23 at the rear. The front wheel or wheels 22 are steered by a suitable steering mechanism including the steering wheel 24 which rotates a steering spindle in the front post 25 to swivel the wheel 22. The front and rear wheels are connected by a suitable chassis frame 27, and carried by this frame are the internal combustion engine, clutch, selective speed transmission and drive to the two rear wheels 23. The tractor is preferably provided with an automatic speed governor which can be set to maintain any desired fixed tractor speed, as is well known in the art. The operator's seat 29 is disposed adjacent to the rear end of the tractor where the operator can have clear forward vision of the plant rows and the relation of the burners to the plant rows. A power take-off shaft projecting from the rear end of the drive housing 31 is adapted to drive the air compressor, as I shall later describe. These cultivator tractors have their rear wheels 23 spaced sufficiently far apart to straddle two plant rows when operating on row crops, these two rows being indicated by the dash and dot lines R and R' in Figure 4. The span between such rear wheels is usually adjustable for adapting the implement to the cultivation of crops having different row spacing. The front steering wheel 22 runs between the rows R and R'.

This type of tractor has provision for mounting an implement carrying rock shaft 33 extending crosswise at the front end of the tractor. Mounting brackets 34 are detachably secured to the forward portion of the tractor frame 27 and the front ends of these brackets carry suitable journals 35 in which the rock shaft 33 is mounted for rocking movement. Such rocking movement is utilized to raise and lower the burner units mounted on the rock shaft, this being accomplished through a manually actuated lever 36 which is accessible to the operator from his position on the tractor seat 29. The lifting lever 36 operates over a latching quadrant 37 and is operatively connected through a link 38 with an arm 39 extending from the rock shaft 33, whereby swinging motion of the manual lever 36 is operative to swing the burner units from a lower operative position to an upper nonoperating position.

There are at least four burner units for the two plant rows R—R', one pair of burner units 41—41' being disposed on the outer sides of said plant rows and another pair of burners 42—42' being disposed on the inner sides of said plant rows. These burners are supported by independent supporting wheels 44 which can rise and fall relatively to the tractor 21 in following the contour of the ground. These four supporting wheels 44 have practically the same operative connection with the rock shaft 33, and, accordingly, a description of one of these supporting wheels and its operative connection will suffice for all. Each wheel is journaled on an axle pin 45 projecting laterally from a bracket 46 which has bolted attachment to the lower end of a spring impelled bar or arm 47. The latter extends upwardly for endwise sliding movement in a tubular guide bracket 48 which is bolted to the rock shaft 33.

The operating relation is such that the rod 47 can slide upwardly and downwardly within the tubular guide bracket 48, and a compression spring 49 surrounding the lower portion of the rod normally tends to thrust the rod downwardly to hold the supporting wheel 44 against the ground under spring pressure. The upper end of the spring abuts the under side of the tubular guide 48 and the lower end of the spring abuts an adjustable collar 51 suitably secured to the arm 47 by a set screw or the like, whereby the collar 51 can be positioned upwardly or downwardly along the bar 47 for increasing or decreasing the effective pressure of the spring 49. A stop collar 52 is secured to the upper end of the bar 47 and is adapted to strike the upper end of the guide sleeve 48 for limiting the downward or outward movement of the bar 47, particularly when these bars and their burner units are swung upwardly to their nonoperating positions. Each burner 41—41' and 42—42' has adjustable mounting on its respective wheel supported bar 47 through the instrumentality of an adjustable mounting bracket 54 adapted to be secured by a bolt or bolts 55 to the bar 47. This adjustable mounting enables the burner to be raised and lowered relatively to its individual supporting wheel 44, and also enables the fore and aft and transverse angles of inclination of the burner to be adjusted relatively to the ground. As best shown in Figures 1 and 4, the two companion burners for each plant row are preferably set in a staggered or offset relation, wherein the flame from one burner is set forwardly in advance of the flame of the other burner so that the two flames act in series on the plant row. Thus, in the arrangement illustrated in Figure 4 the two inner burners 42 and 42' are set in advance of the two outer burners 41 and 41' so that the plant rows are first flamed by the inner burners and then flamed by the outer burners. This reduces the intensity of the flame to which each plant is subjected at any instant of time, but increases the time interval over which the plant is subjected to the flames. It will be evident that as the separate supporting wheels 44 pass over undulations in the ground they cause up and down movement of the spring pressed mounting rods 47 and corresponding up and down movements of the burner units so that the units are always maintained a substantially fixed height above the base of each plant, irrespective of fore and aft or lateral inclination of the tractor.

Positioned forwardly of the burners 41—42 and 41'—42' are the agitating devices which shake the crop plants for causing insects, larvae and other parasites to drop down to the ground where they will be subjected to the flames from the burners. These agitating devices preferably comprise chains 61 which hang from a transversely extending front supporting bar 62. This bar 62 is supported from the front end of the tractor in any suitable manner, such as by having extension arms 34' project forwardly from the spaced supporting brackets 34 for supporting the bar 62 at laterally spaced points. As shown in Figure 2, the chains 61 hang down from the bar 62 in relatively close spacing so as to agitate all portions of each plant as the chains are pulled through and over the plants, whereby insects, larvae and other parasites on the plants are shaken loose and are caused to drop to the ground under the plants where they are subjected to the flaming action of the burners traveling behind the chains. These agitating chains have particular utility in cultivating cotton plants, where the agitation of the chains has a very beneficial effect in shaking loose from the plants a goodly proportion of the boll weevils, punctured or egg infested squares, cotton lice, etc.

Each of the liquid fuel burners 41—41' and 42—42' is of the high pressure atomizing type, such as is diagrammatically illustrated in Figure 6. Each burner comprises an atomizing chamber 65 from which extends a burner nozzle 66. The liquid fuel enters the atomizing chamber 65 under pressure through a fuel tube 67 which terminates in a fuel orifice or nozzle 67'. Compressed air enters the atomizing chamber 65 through an air tube 68 which terminates in an air orifice or nozzle 68'. This air orifice 68' is so positioned with respect to the fuel orifice 67' that the blast of air issuing therefrom exerts a pronounced atomizing effect on the fuel issuing from the fuel orifice. If desired, the capacity of these orifices may be made variable through the substitution of different calibrated orifice plugs, or adjustable metering pins may be provided to vary the area of each orifice. In the preferred arrangement illustrated, I provide a cock or valve 71 at the upper end of the fuel tube 67, and provide a cock or valve 72 at the upper end of the air tube 68. These valves may be employed for regulating purposes or for shut-off purposes. A rubber tube or other flexible tube 74 establishes a communication between the admission side of each valve 71 and a transversely extending fuel manifold pipe 75. This manifold pipe extends transversely of the tractor adjacent to the rock shaft 33, and supplies fuel to all of the burner units. A similar air manifold pipe 76 also extends transversely of the tractor adjacent to the fuel manifold pipe 75. Sections of rubber tubing or other flexible conduit 77 extend from this air manifold pipe to the admission side of the valve 72 connecting with the air jet tube 68. The provision of the sections of flexible tubing 74 and 77 accommodate the rise and fall of the burner units as their supporting wheels pass over undulations in the ground, and also accommodate the upward swinging movement of the burner units when the burners and their supporting wheels are swung upwardly to their nonoperating positions.

A fuel supply pipe 78 extends rearwardly from the fuel manifold 75, and an air supply pipe 79 extends rearwardly from the air manifold 76. These two supply pipes connect respectively with a fuel supply tank 81 and an air supply tank 82, both of which tanks are preferably mounted in upright relation at the rear of the tractor to the left and right sides of the tractor seat 29, as best illustrated in Figure 5. The lower ends of the tanks are rigidly clamped in mounting sockets or mounting steps 83 which are suitably secured to the axle extensions 84 of the drive housing 31. The fuel supply pipe 78 connects with the lower portion of the fuel tank 81 through a valve 86 which is readily accessible to the operator from his position on the tractor seat 29, and which valve may serve as a shut-off valve or as a regulating valve, whereby the operator may shut-off the entire flow of fuel to all of the burner units at any time, or may regulate the total flow to the burner units at any time. Also interposed in the supply line 78 is a suitable moisture trap and outlet 87 which traps moisture and condensation and enables it to be readily drained from the system. The air supply pipe 79 connects with any desired point of the air storage tank 82, preferably adjacent to the upper end thereof as shown in Figure 5. A relief valve 89 opens from the bottom of the air reservoir 82, this valve also serving to drain any condensate from the bottom of the reservoir 82.

The air compressor 91 is preferably a four cylinder, V-type of compressor which is shown as being mounted under the driver's seat 29. A power take-off shaft 92 projects from the rear end of the drive housing 31, and is operatively coupled with the air compressor 91. In the preferred arrangement illustrated, the drive is effected by mounting a sprocket wheel 93 on the power take-off shaft and by mounting a similar sprocket wheel 94 on the compressor shaft, and connecting these two sprocket wheels with the drive chain 95. A protecting housing 96 encloses the sprocket wheels and drive chain. The power take-off shaft 92 can be connected to and disconnected from the engine of the tractor at any time, as is well known in these cultivating types of tractors. An air filter 98 is secured to the chain housing cover 96 and supplies cleaned air through the intake manifolds 99 to the four cylinders of the compressor. The outlet manifold 101 leading from the compressor cylinders conducts the compressed air through an after-cooler 102 which serves to reduce the temperature of the compressed air before entering the air reservoir 82. A check valve 103 is interposed in the pipe connection 104 leading from the after-cooler to the air tank 82. A pressure transmitting pipe 106 extends across from the top of the air tank 82 to the top of the fuel tank 81. An adjusting or regulating valve 107 is interposed in this pipe for controlling the pressure transmitted from the compressed air tank to the fuel tank. This valve 107 is preferably a manually adjusted valve, although I also contemplate the use of an automatic adjustable pressure regulating valve, if desired. It will be noted that the valve 107 is in immediate access to the operator from his position on the tractor seat 29. A pressure gauge 108 is connected to the pressure transmission pipe 106 on the air tank side of the valve 107, whereby this gauge 108 always indicates the pressure existing in the air tank 82. Similarly, another pressure gauge 109 is connected to the pressure transmitting pipe 106 on the fuel tank side of the pressure regulating valve 107 for indicating the pressure prevailing in the fuel tank 81. A pressure relief valve 111 may also be connected with the fuel tank 81 so as to prevent possibility of an abnormally high pressure arising in the tank 81. The liquid fuel is introduced into the tank 81 through a suitable fuel inlet 112 having a shut-off valve 113.

It will be seen from the foregoing that the operator can run the compressor 91 for longer or shorter intervals and thereby increase or decrease the pressures prevailing in the tanks 81 and 82 over a wide range of adjustment. It will also be seen that the operator can establish and maintain any desired pressure differential between the tanks 81 and 82 by opening and closing the valve 107. By the performance of these regulating operations, and the performance of the other regulating and adjusting operations previously described, the operator can readily vary the intensity of the burner flames through a considerable range, and can also vary the length of the burner flames through a substantial range. Under average operating conditions, I find that it is desirable to maintain a pressure of approximately 60 lbs. per square inch in the air tank 82, and a pressure of approximately 40 lbs. per square inch in the fuel tank 81. These pressures give very satisfactory performance when using distillate and other comparable fuel oils. It will be apparent that if it is desired to increase the intensity of the burner flame this can be done by raising the pressure effective on the fuel in the tank 81 for causing an increased proportion of fuel to flow to the burner, and, conversely, when it is desired to reduce the intensity of the flame this can be done by reducing the pressure prevailing in the fuel tank 81. Furthermore, if it is desired to increase or decrease the length of the flame projected from each burner unit, this can be brought about by increasing or decreasing the two pressures prevailing in the compressed air tank 82 and the fuel tank 81, the higher pressures resulting in a longer flame and the lower pressures in a shorter flame. It will thus be seen that the operator can adjust the intensity of the flame and the length of flame to meet all crop conditions, ranging from a low intensity flaming for young crops, to a high intensity flaming for mature crops having relatively thick stalks, and also ranging from a relatively short flame for young crops to a relatively long flame for reaching in under mature crops having long leaves or long upper foliage. Under all of these variable operating conditions, the burner flame is maintained in a relatively fixed relation to the bases of the crop plants by reason of the mounting of the burner units on the separate supporting wheels 44. When the tractor is being run to and from the field, the burner units and supporting wheels 44 can be swung up to inoperative positions raised considerably above the ground. When the burner units and supporting wheels have been swung down to operative position, traveling along the ground, the adjustment afforded through the lever 36 may, if desired, be utilized to incline the spring pressed rods 47 forwardly or rearwardly to a greater or lesser angle to insure free rise and fall of the spring pressed rods in the travel of the wheels 44 over irregularities in the ground level.

Referring now to the modified construction illustrated in Figures 7 to 11 inclusive, this modified embodiment differs from the preceding embodiment principally in the feature of having the independent wheel supports for the burner units pivotally mounted so as to be capable of an up and down swinging movement instead of an endwise sliding movement when passing over irregular ground; also, in the feature of having the burner units project a fan shaped or fishtail flame; and, furthermore, in the feature or providing leaf lifting devices for lifting the lower leaves or foilage of the crop plants up out of the direct path of the flames issuing from the burner nozzles. The construction of the tractor 21 and the arrangement of the various parts thereon is substantially the same in the case of this modified embodiment, and hence the description of that portion of the disclosure need not be repeated. The bracket arms 34 extending forwardly from the tractor carry the transverse rock shaft 33, and extensions 34′ of these bracket arms project forwardly for mounting the rod 62 and chains 61, substantially as heretofore described. Each independent supporting wheel 44 is journaled on the lower end of a supporting arm 121 which has its upper end journaled for free swinging movement about the rock shaft 33. As best shown in Figure 7, each arm 121 has its upper end secured in the lower portion of a mounting yoke 122, the arms of which are formed with split bearings 123 adapted to be mounted over bearing bushings 124. The bushings have wide outer grooves formed therein, and the split bearing bosses 123 are assembled in these grooves for rotation therein. Stop collars 126 are secured to the rock shaft 33 by set screws 127 or the like for determining the lateral position of each yoke 122 along the rock shaft 33. It will be understood that by loosening the set screws 127 in the stop collars 126 the entire yoke and arm assembly can be shifted transversely to different positions along the rock shaft 33 if it should be desired to adjust the lateral position of one or more burner units to accommodate different row spacing of the crop plants or to dispose the burners closer to or further from the plants. A lifting arm 128 extends downwardly from a hub 129 which is mounted on the rock shaft 33 between the arms of the yoke 122. The hub 129 is free to slide endwise along the shaft 33 in the performance of any shifting adjustments of the yoke along the shaft, but said hub and lifting arm are compelled to rock directly with the shaft 33, such result being obtained either by forming the rock shaft of polygonal cross section or by providing a sliding key or spline arrangement between the rock shaft and the hub 129. As shown in Figure 9, the lifting arm 128 normally occupies a position spaced rearwardly from the yoke 122 and arm 121, so that the arm 121 is free to swing up and down with the wheel 44 as the latter passes over uneven ground. However, when the operator desires to swing the burner units and their wheel supports up to a nonoperating position, as when driving the tractor to or from the field, he actuates the hand lever 36 in the same manner previously described for rocking the rock shaft 33 in a counterclockwise direction. This swings the lifting arms 128 forwardly for positively raising all of the wheel supported arms 121 upwardly to their nonoperating positions. Each of these wheel supported arms 121 is preferably of cylindrical tubular cross section, and has its lower end curved forwardly and bent laterally to form a journal on which the ground wheel 44 is mounted. These arms 121 are shown as being inclined in a forward direction in order to dispose the burner units 41—41′ and 42—42′ considerably in advance of the pneumatic tire on the front tractor wheel 22, but my invention also contemplates an alternative arrangement wherein the arms 121 are inclined downwardly in a rearward direction from the axis of the rock shaft 33, particularly where this rock shaft is disposed further forward, or where the entire front tractor wheel 22 is of such construction, or is laterally shielded in such manner, that the heat of the burner flames will not injure this wheel. As each supporting wheel 44 passes over irregularities in the ground it swings its own supporting arm 121 upwardly or downwardly entirely independently of the other supporting arms and of the tractor.

Figure 10:
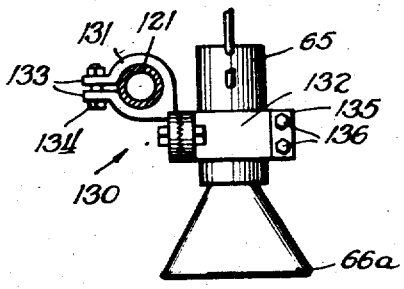
Figure 10 is a detail elevational view of one of the adjustable mounting clamps for mounting the burner units.

Each burner unit is mounted on one of these supporting arms 121 in such manner that the burner can be adjusted vertically to different heights along the straight portion of the arm, and can also be swiveled horizontally to different angular positions around the axis of this arm. Figure 10 illustrates a typical clamping type of mounting which enables the burner unit to have these adjustments relatively to said arm. The clamp or mounting bracket is designated 130 in its entirety, and comprises a first clamping section 131 which clamps around the arm 121, and a second clamping section 132 which clamps around the burner unit. The section 131 is of split formation formed with ears 133 projecting forwardly from each semicircular half and adapted to receive clamping bolts 134. This arrangement enables the section 131 to be slid up and down along the tubular arm 121, and to be swiveled around the arm to different angular positions. The other clamping section 132 is also of split formation, comprising ears 135 projecting from the semicircular halves and adapted to receive the clamping bolts 136. This clamping section engages around the cylindrical atomizing chamber 65 of the burner unit, and enables the burner unit to be shifted forwardly or backwardly in the clamping section, or to be rotated axially about the center of the clamping section to dispose the fan-shaped burner nozzle 66a at different angles. Projecting from the first clamping section 121, at an angle thereto, is a substantially circular clamping boss 137, and projecting from the second clamping section 132, at an angle thereto, is a companion boss 138. These two bosses are formed with circularly formed clamping faces provided with radially extending serrations 137' and 138' respectively which are clamped in matching relation by a clamping bolt 139 passing through the two bosses. Releasing this bolt enables the second clamping section 132 to be swiveled upwardly or downwardly around the axis of the bolt 139, thereby enabling the vertical angle of the burner unit to be turned upwardly or downwardly for directing the burner flame more obliquely or less obliquely to the surface of the ground.

Figure 11:
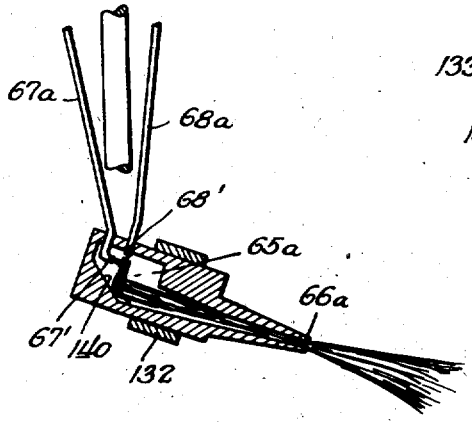
Figure 11 is a view similar to Figure 6, showing a modified construction of burner unit.

This modified embodiment illustrates the preferred construction of burner unit wherein the nozzle is of fan-shaped or fishtail outline, as indicated at 66a. This form of nozzle is advantageous for the purpose of producing a flame which is of considerable width horizontally for covering a large area of ground, but which is of relatively shallow depth vertically so as to minimize injury to the lower leaves and lower foliage extending outwardly from the crop plants. Figure 11 illustrates the slightly modified form of atomizing chamber 65a which may be embodied in any of these burner units. In this modified construction, the liquid fuel enters the upper rear portion of the atomizing chamber through fuel tube 67a terminating in fuel orifice 67', and the compressed air enters the upper portion of the atomizing chamber through air tube 68a terminating in air jet 68'. The rear end of the atomizing chamber is formed with an oblique deflecting surface 140. The air orifice 68' discharges across the end of the fuel orifice 67' and impinges at an angle on the deflecting surface 140. The construction and arrangement is such that the stream of air issuing from the air orifice exerts a pronounced atomizing effect on the stream of fuel issuing from the fuel orifice at right angles thereto, this mixture of air and fuel then striking the deflecting surface 140 and being deflected at a downward inclination through the fan-shaped nozzle 68a. The impingement of the air and the fuel particles against the inclined deflecting surface 140 causes the fuel particles to be subjected to further atomization, and, in addition, the striking of the stream of air and fuel against such surface tends to fan the stream outwardly in sidewise relation to aid in forming the fishtail-shape of flame issuing from the nozzle 66a. While the modified construction of burner illustrated in Figure 11 is the preferred construction for average working conditions and average types of plants, other working conditions or other types of plants may make it advisable to employ the circular type of burner nozzle 66 in conjunction with the deflecting type of atomizing chamber 65a, or to employ the fan-shaped nozzle 66a in conjunction with the straight atomizing chamber 65, if desired.

Referring to Figure 8, I have shown the same previously described arrangement of outer and inner burners 41 and 42 for the right hand plant row R, and outer and inner burners 41' and 42' for the left hand plant row R'. The inner and outer burners of each pair are likewise arranged in staggered or offset relation, preferably with the inner burners 42, 42' disposed forwardly of the outer burners 41, 41', although this arrangement may be reversed if desired. The degree of offset between the burners is preferably such that the rear edge of the fan-shaped flame of the front burner approximately coincides with the forward edge of the fan-shaped flame of the rear burner. This results in the burners covering a maximum expanse of horizontal area along the crop row, with a minimum vertical depth of flame. Figure 7 illustrates the preferred setting of the burners for average crop and soil conditions, with the burner flames striking the ground short of the plant and then fanning out beyond the plant or around it.

The modified embodiment shown in Figures 7 to 11 inclusive, also illustrates the provision of additional burners arranged to flame the middle areas between the plant rows. These middle areas will be flamed to some extent by the transversely extending burners 41—41', 42—42', but the middle areas may be flamed more intensively by providing additional burners devoted primarily to those areas. Such additional burners are typically illustrated at 141—141' and 142—142' in Figures 7 and 8. These latter burners can be identical in all respects with the transversely extending burners, the only difference being of the angle of mounting on their respective wheel supported arms 121. This angle is in a more or less forward direction, with the fan-shaped flames concentrated more directly on the middle areas between the plant rows, as clearly shown in Figure 8. The flaming of the middle areas destroys or inhibits the obnoxious vegetation in these areas, and also acts on a small percentage of the boll weevils, larvae, punctured or egg infested squares, cotton lice and other parasites which may be lying on the ground in these middle areas.

In this modified embodiment illustrated in Figures 7 to 11 inclusive, I have also shown leaf lifting devices for raising the lower leaves of long leaved plants so as to get these leaves up out of the direct path of the flames issuing from the burners. An outer leaf lifter 151 follows along the outer side of each plant row, and an inner leaf lifter 152 follows along the inner side of each plant row. As shown in plan in Figure 8, the forward ends of these leaf lifters curve away from the line of the plant row, as indicated at 151' and 152'. These curved forward ends form deflecting surfaces or sloping guide surfaces for deflecting the plants and their lower leaves into the passageway between the straight rear ends of the leaf lifters. Viewed in side elevation, as shown in Figure 9, the forward end of each leaf lifter travels in relatively close proximity to the ground, being maintained at a spaced distance from the ground by the associated supporting wheel 44. From this front end the leaf lifter slopes upwardly to raise the lower leaves of the plant to a plane above the flames projected transversely by the staggered burners 41—42, 41'—42'. The rear end of the lifter can slope downwardly, if desired, at a point beyond the transverse plane of its associated burner. Each leaf lifter may be arranged for independent mounting on the adjacent wheel supported arm 121 through the medium of an adjustable mounting bracket, if desired, but a more simplified arrangement is to mount each leaf lifter on its associated burner unit. This can be readily accomplished by riveting or welding bars 154 to the nozzle 66a of each transverse burner, and having these bars extend outwardly and upwardly for attachment to the leaf lifter at points approximately in prolongation of the burner nozzle. This mounting will insure that each leaf lifter will remain in a predetermined relation to its respective burner unit in any adjustment of the burner unit. As shown in Figures 7 and 8, the two leaf lifters at each side of each crop plant move in under the long lower leaves and lower foliage of the plant and gradually deflect these leaves and foliage upwardly so that the transverse burners can project their flames against the bases of the plants and over the adjacent ground without having these lower leaves and lower foliage in the direct path of the flames where they might be deleteriously burned by the flames. It will also be noted that the two leaf lifters 151 and 152 cooperate to form a guiding throat for straightening up plants which may be leaning to one side. and for deflecting plants which are substantially out of line in the plant row back to a position more nearly in line, whereby to properly position all of the plants for the most effective action of the burner flames on the bases of the plants and the surrounding ground areas. These leaf lifters are of particular advantage in connection with tobacco, corn and other long leaved plants, but need not be employed in connection with these crops or other crops when the leaves are short and do not get into the path of the burner flames.

My improved cultivator can also be used on pineapple plantations and in other situations where paper is used to control weed growth. Tests have proven that celery paper will not be ignited by the burner flames. Other papers may require that the burner flames be reduced in intensity, but the wide range of adjustment which can be obtained by my improved regulating apparatus makes this entirely practicable. The wide range of regulation of the intensity and size of the burner flames can also be utilized to compensate for wind conditions. The speed of the tractor can be widely adjusted by variation of the governor setting, and by the selection of different speed ratios in the transmission, so as to increase or decrease the length of time that each crop plant is subjected to the action of the flame. For example, with a typical tractor having a three-speed or four-speed transmission, a variety of speeds ranging from ½ mile per hour to 4 or 5 miles per hour can be had for a wide variety of typical operating conditions. Different types of crops, different stages of insect life, different types of weeds and grasses, different seasons and stages in the life of the crop and other related factors create a wide variety of operating conditions, to all of which my improved implement can be adapted. Under certain operating conditions it may be desirable to flame the plant rows or hills immediately after planting and before the plants have come up.

While I have illustrated and described what I regard to be the preferred embodiments of my invention, nevertheless it will be understood that such are merely exemplary and that numerous modifications and rearrangements may be made therein without departing from the essence of the invention.

I claim:

1. In a flame cultivator for eradicating weeds from row crops by the flame method, the combination of a wheeled vehicle adapted to travel along a plant row, fuel supply means on said vehicle for supplying liquid fuel under pressures of approximately 40 pounds per square inch, air supply means on said vehicle for supplying compressed air under pressures of approximately 60 pounds per square inch, a plurality of high pressure atomizing burners propelled by said vehicle and having a fuel nozzle connected to receive liquid fuel under pressure from said fuel supply means and having an air nozzle connected to receive compressed air from said air supply means, said air nozzle exerting an atomizing action on the fuel from the fuel nozzle in each burner and also creating a long flame, said burners being arranged to project relatively long flames upon the ground on opposite sides of the plant row and directed generally crosswise of the plant row whereby said long flames pass through and beyond the plant row for destroying weeds directly in the plant row, and regulating means cooperating with one of said supply means for controlling the intensity of flame or length of flame projected from each burner.

2. In a cultivator adapted to cultivate row crops by the flame method, the combination of a tractor having a front wheel traveling between adjacent rows and rear wheels spanning adjacent hows, a fuel reservoir on said tractor, a compressed air reservoir on said tractor, means driven by the tractor engine for maintaining pressures in both of said reservoirs, a plurality of high pressure atomizing burners connected with the forward portion of the tractor and receiving fuel and air under pressure from said reservoir, said burners being arranged to project relatively long flames upon the ground on opposite sides of adjacent plant rows straddled by the tractor and directed generally toward the plants in the two plant rows, and regulating means cooperating with one of said reservoirs for controlling the length or intensity of flame projected from each burner.

3. Apparatus for eradicating weeds from row crops by the flame method comprising a vehicle adapted to travel along the plant row, a plurality of burners propelled by said vehicle and disposed on each side of said row in position to project flames substantially crosswise of the plant row, and means carried by said vehicle for supplying liquid fuel and air to separate fuel and air nozzles in said burners under pressures of approximately 40 pounds for the fuel and 60 pounds for the air whereby to atomize the liquid fuel at each burner and to cause each burner to project a relatively long flame which is directed substantially crosswise of the plant row to pass through and beyond the plan row at a level below the lower leaves of the crop plants for flaming the ground immediately around the bases of the crop plants without injuring the upper foliage of the plant.

4. In a cultivator adapted to cultivate row crops by the flame method, the combination of a wheeled vehicle, a burner disposed angularly with respect to the plant row projecting a long flame crosswise of the plant row whereby said long flame passes through and beyond the plant row to act on weeds in the row in the travel of said vehicle, means on said wheeled vehicle for supplying fuel to said burner, and a wheeled support for said burner coupled to said wheeled vehicle whereby said burner is propelled by said vehicle but can rise and fall relatively thereto in the travel of its wheeled support over the ground.

5. In a cultivator adapted to cultivate row crops by the flame method, the combination of a tractor having a front wheel traveling between adjacent rows and rear wheels spanning adjacent rows, a plurality of burners positioned between said adjacent rows and on the outer sides of said adjacent rows and projecting flames upon the ground or adjacent to the bases of the plants in said rows, means on said tractor for supplying fuel to said burners, separate supporting wheels for each of said burners, and means coupling said separate supporting wheels with said tractor whereby each burner and its separate supporting wheel can rise and fall relatively to said tractor and to the other burners in the travel of the cultivator over uneven ground.

6. In apparatus of the class described, the combination of a wheeled vehicle, a burner propelled by said vehicle adapted to project a flame in predetermined relation to the crop in the travel of said vehicle, means on the vehicle for supplying fuel to said burner, and a separate wheeled support for said burner comprising an arm having endwise slidable connection with said wheeled vehicle, a separate supporting wheel at the lower end of said arm, and spring means acting on said arm normally thrusting said separate supporting wheel against the ground.

7. In apparatus of the class described, the combination of a wheeled vehicle, a plurality of burners propelled by said vehicle adapted to project flames in predetermined relation to the crop in the travel of the vehicle, means on the vehicle for supplying fuel to said burners, and separate wheeled supports for said burners each comprising an arm pivotally mounted on said wheeled vehicle for up and down swinging movement, and a ground wheel at the lower end of each arm capable of rising and falling relatively to the wheeled vehicle and to the other burners, whereby each burner is maintained at a substantially fixed height above the ground during the travel of the vehicle over uneven ground.

8. In a cultivator adapted to cultivate row crops by the flame method, the combination of a wheeled vehicle adapted to travel along the plant rows, and a pair of burners propelled by said vehicle and adapted to project flames substantially crosswise of the row in the travel of the vehicle along the row, said burners being in staggered relation whereby the flame from one burner acts on the plants or ground area of the row in advance of the flame from the other burner.

9. In a cultivator adapted to cultivate row crops by the flame method, the combination of a tractor having a front wheel traveling between adjacent rows and rear wheels straddling adjacent rows, a pair of outer burners on said tractor positioned to travel along the outer sides of said adjacent rows, and a pair of inner burners on said tractor positioned to travel along the inner sides of said adjacent rows, said burners projecting their flames substantially crosswise of said rows and the burners acting on each row being offset with respect to each other whereby their flames act in series on the plants in each row.

10. In an implement adapted to cultivate crops by the flame method, the combination of a wheeled vehicle, and a burner propelled by said vehicle and operative to project a flame in predetermined relation to the crop, said burner being constructed and arranged to project a flame of relatively wide horizontal dimension so as to cover a considerable area of ground, and of relatively small vertical dimension so as to minimize the likelihood of injuriously burning the upper foliage of the crop.

11. In a cultivator adapted to cultivate row crops by the flame method, the combination of a tractor adapted to travel along the plant row, fluid fuel burners of the pressure type propelled by said tractor along opposite sides of the plant row for flaming the ground around the plants in said row, and means on the tractor for supplying fuel to said burners, said burners being constructed and arranged to project a fan-shaped flame over the ground of relatively wide horizontal dimension and of relatively small vertical dimension.

12. In a cultivator adapted to cultivate row crops by the flame method, the combination of a wheeled vehicle, a burner propelled by the vehicle projecting a relatively long unobstructed flame substantially crosswise of the plant row and entirely through and beyond the plant row for direct impingement against weeds in the plant row, and means carried by said vehicle for lifting the lower leaves of the crop plants substantially out of the path of said flame during the cultivating operation.

13. In a cultivator adapted to cultivate row crops by the flame method, the combination of a tractor having a front wheel traveling between adjacent rows and rear wheels spanning adjacent rows, a plurality of fluid fuel burners propelled by said tractor and disposed at the outer and inner sides of said adjacent rows for projecting flames around the bases of the crop plants in said rows, and leaf lifting deflectors carried by said tractor on the outer and inner sides of said plant rows for lifting the lower leaves of the crop plants in said rows substantially out of the path of the flames from said burners as the cultivator travels along said rows.

14. In apparatus of the class described, the combination of a wheeled vehicle adapted to travel along plant rows, means carried by said vehicle for shaking the plants to cause insects and other parasites to fall from the plants down to the ground, and a burner propelled by the vehicle operative to thereafter project a relatively long unobstructed flame substantially crosswise of the plant row to pass through the plant row for impingement against the ground directly under the plants to destroy such insects and other parasites.

15. The method of destroying or inhibiting insects and other parasites in row crop plants, which comprises shaking the crop plants so as to cause the insects and other parasites to fall from the plants down upon the ground, projecting a relatively long unconfined flame substantially crosswise of the plant row to pass through and beyond said row whereby said long flame impinges directly against the ground substantially under the plants to destroy or inhibit insects or other parasites on the ground under the plants, and moving the flame along the row at a rate which will destroy or inhibit such insects or other parasites without causing substantial injury to the crop plants.

16. In a cultivator adapted to cultivate row crops by the flame method, the combination of a tractor having a front wheel traveling between adjacent rows and rear wheels straddling adjacent rows, a plurality of burners propelled by said tractor positioned between said adjacent rows and on the outer sides of said adjacent rows and projecting flames substantially crosswise of said rows, and burners propelled by said tractor and positioned to project flames along the middle areas between said rows.

17. In a cultivator adapted to cultivate row crops by the flame method, the combination of a tractor having a front wheel traveling between adjacent rows and rear wheels straddling adjacent rows, a plurality of burners propelled by the tractor and adapted to project flames from the inner and outer sides of said plant rows around the bases of the plants in said rows, and adjustable mounting clamps connecting said burners with said tractor whereby said burners can be inclined to different vertical angles and can be swiveled to different horizontal angles.

18. In a cultivator adapted to cultivate row crops by the flame method, the combination of a tractor having a front wheel traveling between adjacent rows and rear wheels straddling adjacent rows, a plurality of burners propelled by the tractor and positioned on the outer and inner sides of said adjacent rows for projecting flames around the bases of the plants in said rows, and means mounting said burners on said tractor enabling said burners to be adjusted transversely of the tractor to accommodate different row spacing of different crops.

19. The method of treating a standing row of stemmed crop plants to suppress insect life on the plants which comprises agitating the plants to cause the insects to drop therefrom to the ground beneath the plants, directing relatively long unconfined blasts of hot fluid from each side of the standing row substantially crosswise of the row to pass through and beyond the standing row, said blasts bathing the insects, the vegetation, and the stems of the standing crop plants in the hot fluid, and moving the blasts of hot fluid along the row at a rate which will continue the application of heat long enough to injure the insect life without substantial injury to the crop plants.

20. In an implement adapted to remove weeds from plant rows by the flame method, the combination of a tractor, an air compressor driven by the engine of said tractor, an air reservoir and a fuel reservoir on said tractor, conduit means interconnecting said compressor and said air reservoir, conduit means interconnecting said air reservoir and said fuel reservoir, fluid fuel burners of the pressure type propelled by the tractor, each of said burners comprising a fuel jet and an air jet, said air jet exerting a mechanical atomizing action on the fuel issuing from said fuel jet and also causing said burner to project a relatively long flame, said burner being disposed to project said long flame substantially unobstructed in a direction crosswise of the plant row to pass through and beyond the plant row for impinging against weeds in the row in the travel of the tractor, conduit means interconnecting said fuel reservoir and fuel jet, conduit means interconnecting said air reservoir and air jet, and regulating apparatus for governing the action of said burners comprising adjustable valve means in said conduit means interconnecting said air and fuel reservoirs for establishing a pressure differential between said reservoirs, and adjustable valve means in said conduit means interconnecting said fuel reservoir and said fuel jet for varying the rate of flow of fuel to said burners.

21. In an implement of the class described, the combination of a wheeled vehicle, a plurality of burners carried thereby adapted to project flames in predetermined relation to a growing crop, means on said vehicle for supplying fuel to said burners, supporting arms for said burners, and adjustable mounting clamps for adjustably mounting said burners on said supporting arms, each of said mounting clamps comprising a first clamp section embracing a supporting arm and shiftable to different vertical positions and to different angular positions relatively to said arm, a second clamp section embracing the burner and enabling the latter to be rotated to different angular positions in said clamp section, and means adjustably coupling said clamp sections together in different angular positions, whereby to provide a wide range of adjustment of the burner.

22. In a cultivator adapted to cultivate row crops by the flame method, the combination of a tractor having a front wheel traveling between adjacent rows and rear wheels straddling adjacent rows, a rock shaft extending transversely across the front portion of said tractor, means operative to rock said rock shaft, and burners carried by said rock shaft and disposed on the inner and outer sides of said adjacent rows to project flames on the bases of the plants in said rows, the rocking of said rock shaft being operative to swing said burners upwardly to non-operating positions.

23. In a cultivator adapted to cultivate row crops by the flame method, the combination of a tractor having a front wheel traveling between adjacent rows and rear wheels straddling said adjacent rows, a plurality of burners on said tractor disposed on the outer and inner sides of said adjacent rows and projecting flames on the bases of the plants in said rows, a fuel reservoir on said tractor supplying fuel to said burners, a compressed air reservoir on said tractor supplying compressed air to said burners, and a compressor driven by said tractor for supplying pressure to said reservoirs.

24. In a cultivator adapted to cultivate row crops by the flame method, the combination of a wheeled vehicle, a burner disposed to project a relatively long flame substantially crosswise of the plant row to pass through the row, whereby said flame is caused to impinge directly against weeds in the plant row in the travel of said vehicle, means on said wheeled vehicle for supplying fuel to said burner, and a ground engaging support for said burner coupled to said wheeled vehicle whereby said burner is propelled by said vehicle but can rise and fall relatively thereto in the travel of its ground engaging support over the ground.

25. In a cultivator adapted to cultivate row crops by the flame method, the combination of a wheeled vehicle adapted to travel along the plant rows, a plurality of burners propelled by said vehicle projecting relatively wide fan-shaped flames substantially crosswise of the plant rows, means on said vehicle for supplying fuel to said burners, separate ground engaging supports for said burners, and means pivotally coupling said separate ground engaging supports with said wheeled vehicle whereby each burner and its separate ground engaging support can rise and fall relatively to said wheeled vehicle and to the other burner in the travel of the ground engaging supports over uneven ground.

26. In a cultivator adapted to cultivate row crops by the flame method, the combination of a wheeled vehicle adapted to span one or more plant rows, a plurality of burners propelled by said vehicle projecting relatively wide fan-shaped flames substantially crosswise of said plant rows from opposite sides of the row for passing through the row, means on said vehicle for supplying fuel to said burners, an individual ground engaging support for each of said burners, adjustable clamp means interconnecting each burner and its individual ground engaging support so as to enable the burner to be adjusted relatively to its support, means individual to each ground engaging support for movably coupling the same with said wheeled vehicle whereby each burner and its individual ground engaging support can rise and fall relatively to said wheeled vehicle and to the other burners in the travel of the ground engaging supports over uneven ground, and lifting means actuatable by the operator from his driving position on said wheeled vehicle while the latter is in motion for lifting all of said burners to non-operating positions.

27. In a cultivator adapted to cultivate row crops by the flame method, the combination of a wheeled vehicle adapted to travel along the rows, a plurality of burners propelled by said vehicle projecting flames around the bases of the plants in the plant rows, free floating ground engaging supports for said burners, and adjustable means connecting said ground engaging supports with said vehicle enabling said ground engaging supports and burners to be shifted transversely relatively to each other to different positions crosswise of said vehicle.

28. In a cultivator adapted to cultivate row crops by the flame method, the combination of a wheeled vehicle adapted to travel along adjacent rows, a plurality of burners propelled by said vehicle positioned between said adjacent rows and on the outer sides of said adjacent rows and projecting flames substantially crosswise of said rows, and burners propelled by said vehicle and positioned to project flames along the middle areas between said rows.

29. In a cultivator adapted to cultivate row crops by the flame method, the combination of a wheeled vehicle adapted to travel along adjacent rows, a plurality of burners propelled by said vehicle and adapted to project flames from the inner and outer sides of said plant rows around the bases of the plants in said rows, and adjustable mounting clamps connecting said burners with said vehicle whereby said burners can be inclined to different vertical angles and can be swiveled to different horizontal angles.

30. In a cultivator adapted to cultivate row crops by the flame method, the combination of a wheeled vehicle adapted to travel along adjacent rows, a plurality of burners propelled by said vehicle and positioned on the outer and inner sides of said adjacent rows for projecting flames around the bases of the plants in said rows, and means mounting said burners on said vehicle enabling said burners to be adjusted transversely of the vehicle to accommodate different row spacing of different crops.

31. In a cultivator adapted to cultivate row crops by the flame method, the combination of a wheeled vehicle adapted to travel along adjacent rows, a rock shaft extending transversely of said wheeled vehicle, means operative to rock said rock shaft, and burners carried by said rock shaft and disposed along the sides of said adjacent rows to project flames on the bases of the plants in said rows, the rocking of said rock shaft being operative to swing said burners upwardly to non-operating position.

32. In a cultivator adapted to cultivate row crops by the flame method, the combination of a tractor adapted to travel along adjacent plant rows, a plurality of burners on said tractor disposed along the sides of said adjacent rows and projecting flames on the bases of the plants in said rows, a fuel reservoir on said tractor supplying fuel to said burners, a compressed air reservoir on said tractor supplying compressed air to said burners, and a compressor driven by said tractor for supplying pressure to said reservoirs.

33. In a cultivator adapted to cultivate row crops by the flame method, the combination for mounting on a wheeled vehicle of a burner disposed angularly with respect to the plant row, fuel supply means connected to said burner, said burner and fuel supply means cooperating to cause said burner to project a relatively long flame crosswise of the plant row whereby said long flame passes through and beyond the plant row to act on weeds in the row, and a ground engaging support for carrying said burner and disposed to be movably connected to said vehicle whereby said burner when propelled by said vehicle can rise and fall relatively thereto in the travel of its support over the ground.

34. In a cultivator adapted to cultivate row crops by the flame method, the combination for mounting on a wheeled vehicle adapted to travel along the plant rows of a pair of burners, a support member for each burner adapted to be movably attached to said vehicle and to carry said burners in staggered relation, fuel supply means connected to said burners, said burners and fuel supply means cooperating to cause said burners to project relatively long flames substantially crosswise of a plant row whereby said long flames pass through and beyond the plant row and act on weeds in the row and the flame from one burner acts on the plants or ground area of the row in advance of the flame from the other burner, and a ground engaging support for each support member whereby said burners when propelled by said vehicle can individually rise and fall relatively thereto in the travel of their ground engaging supports over the ground.

35. In an implement adapted to cultivate crops by the flame method, the combination for mounting on a wheeled vehicle, of a burner operative to project a flame in predetermined relation to the crop, said burner having a fan shaped nozzle to project a flame of relatively wide horizontal dimension so as to cover a considerable area of ground, and of relatively small vertical dimension so as to minimize the likelihood of injuriously burning the upper foliage of the crop, a support disposed to be connected to said vehicle for carrying said burner in the aforesaid relation to the crop, and fuel supply means connected to said burners for supplying fuel thereto to maintain said flame.

36. In a cultivator adapted to cultivate row crops by the flame method, the combination for mounting on a wheeled vehicle of a burner disposed angularly with respect to the plant row, fuel supply means connected to said burner, said burner and fuel supply means cooperating to cause said burner to project a relatively long flame crosswise of the plant row whereby said long flame passes through and beyond the plant row to act on weeds in the row, a support adapted to be connected to said vehicle for carrying said burner, and means also adapted to be carried by said vehicle and to be moved thereby immediately ahead of said burner for lifting the lower leaves of the crop plants substantially out of the path of said flame during the cultivating operation.

37. In apparatus of the class described, the combination for mounting on a wheeled vehicle adapted to travel along plant rows of means adapted to be carried by the forward part of said vehicle for shaking the plants to cause insects and other parasites to fall from the plants down to the ground, a burner adapted to be carried by said vehicle behind said plant shaking means, and fuel supply means connected to said burner, said burner and fuel supply means cooperating to cause said burner to project a relatively long flame crosswise of the plant row to pass through the plant row for impingement against the ground directly under the plants to destroy such insects and other parasites and to act on weeds in the plant row.

38. In an implement of the class described, the combination for mounting on a wheeled vehicle of a plurality of burners adapted to project flames in predetermined relation to a growing crop, fuel supply means connected to said burners for supplying fuel thereto, supporting arms for said burners, and adjustable mounting clamps for adjustably mounting said burners on said supporting arms, each of said mounting clamps comprising a first clamp section embracing a supporting arm and shiftable to different vertical positions and to different angular positions relatively to said arm, a second clamp section embracing the burner and enabling the latter to be rotated to different angular positions in said clamp section, and means adjustably coupling said clamp sections together in different angular positions, whereby to provide a wide range of adjustment of the burner.

39. In a cultivator adapted to cultivate row crops by the flame method, the combination for mounting on a wheeled vehicle of a burner disposed angularly with respect to the plant row, fuel supply means connected to said burner, said burner and fuel supply means cooperating to cause said burner to project a relatively long flame crosswise of the plant row whereby said long flame passes through and beyond the plant row to act on weeds in the row, and a ground engaging support for carrying said burner and disposed to be rockably connected to said vehicle whereby said burner when propelled by said vehicle can rise and fall relatively thereto in the travel of its support over the ground.

40. In a cultivator adapted to cultivate row crops by the flame method, the combination for mounting on a wheeled vehicle adapted to travel along the rows, of a plurality of burners projecting flames around the bases of the plants in the plant rows, ground engaging supports for said burners adapted to be connected to said vehicle in a free floating manner whereby said burners are propelled by said vehicle but can rise and fall relatively thereto in the travel of their individual ground engaging supports over the ground, and adjustable means enabling said ground engaging supports and burners to be shifted transversely relatively to each other to different positions crosswise of said vehicle.

41. In a cultivator adapted to cultivate row crops by the flame method, the combination for mounting on a wheeled vehicle adapted to travel along adjacent rows of a first set of burners positioned between said adjacent rows and on the outer sides of said adjacent rows for projecting flames substantially crosswise of said rows, support means adapted to be connected to said vehicle for carrying said first set of burners, a second set of burners positioned to project flames along the area between said adjacent rows, and support means also adapted to be connected to said vehicle for carrying said second set of burners.

42. In a cultivator adapted to cultivate row crops by the flame method, the combination for mounting on a wheeled vehicle adapted to travel along adjacent rows, of a plurality of burners, fuel supply means connected to said burners, said burners and fuel supply means cooperating to cause said burners to project flames from the inner and outer sides of said plant rows around the bases of the plants in said rows, a support member for each burner adapted to be carried by said vehicle, and adjustable clamps for mounting said burners on said support members whereby with respect to the ground said burners can be inclined to different vertical angles and can be swiveled to different horizontal angles.

43. In a cultivator adapted to cultivate row crops by the flame method, the combination for mounting on a wheeled vehicle adapted to travel along adjacent rows, of a plurality of burners positioned on the outer and inner sides of each of said adjacent rows, support means adapted to be connected to said vehicle for carrying said burners in the aforesaid positions, means enabling said support means and thereby said burners to be adjusted transversely of said vehicle to accommodate different row spacing of different crops, and fuel supply means for said burners, said burners and fuel supply means cooperating to cause said burners to project flames around the bases of the plants in said rows.

44. In a cultivator adapted to cultivate row crops by the flame method, the combination for mounting on a wheeled vehicle adapted to travel along adjacent rows of a transversely extending rock shaft, means operatively connected to said rock shaft for rocking the same, and burners carried by said rock shaft and disposed along the opposite sides of each of said adjacent rows to project flames on the bases of the plants in said rows crosswise thereof, the rocking of said rock shaft being operative to swing said burners upwardly to nonoperating position.

45. In a cultivator adapted to cultivate row crops by the flame method, the combination for mounting on a wheeled vehicle adapted to travel along the rows, of a plurality of burners projecting flames around the bases of the plants in the plant rows, and ground engaging supports for said burners adapted to be connected to said vehicle in a free floating manner whereby said burners are propelled by said vehicle but can rise and fall relatively thereto in the travel of their individual ground engaging supports over the ground.

46. Means attachable to a vehicle adapted to travel along plant rows for cultivating the same by the flame method comprising an attachment for connection to the vehicle, an arm swingingly connected at the upper end on said attachment, a ground engaging element at the lower end of said swinging arm, and a burner carried by said arm crosswise thereof near said lower end.

47. Means attachable to a vehicle adapted to travel along plant rows for cultivating the same by the flame method comprising an attachment for connection to the vehicle, a ground engaging member swingingly connected to said attachment whereby the movement thereof partakes of the movement of the vehicle and of the rise and fall of the ground engaging part as the contour of the ground varies, and a burner carried by said ground engaging member crosswise thereof adjacent said ground engaging part so that the movement of the burner corresponds closely to variations in the contour of the ground.

PRICE C. McLEMORE.